United States Patent
Magee et al.

(10) Patent No.: US 7,324,602 B2
(45) Date of Patent: Jan. 29, 2008

(54) SCALABLE TIME-ORTHOGONAL PREAMBLE SUPPLEMENT GENERATOR, METHOD OF GENERATING AND MULTIPLE-INPUT, MULTIPLE-OUTPUT COMMUNICATION SYSTEM EMPLOYING THE GENERATOR AND METHOD

(75) Inventors: David P. Magee, Plano, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 657 days.

(21) Appl. No.: 10/886,480

(22) Filed: Jul. 7, 2004

(65) Prior Publication Data

US 2006/0008023 A1 Jan. 12, 2006

(51) Int. Cl.
*H04L 1/02* (2006.01)
(52) U.S. Cl. ...................................................... 375/267
(58) Field of Classification Search ................ 375/260, 375/267, 295, 349; 455/101; 370/334
See application file for complete search history.

(56) References Cited

U.S. PATENT DOCUMENTS

| | | | |
|---|---|---|---|
| 2004/0136464 A1* | 7/2004 | Suh et al. | 375/260 |
| 2005/0018750 A1* | 1/2005 | Foerster et al. | 375/130 |
| 2006/0251193 A1* | 11/2006 | Kopmeiners et al. | 375/345 |

* cited by examiner

*Primary Examiner*—Khanh C. Tran
(74) *Attorney, Agent, or Firm*—Steven A. Shaw; W. James Brady; Frederick J. Telecky, Jr.

(57) ABSTRACT

The present invention provides a time-orthogonal preamble supplement generator for use with a multiple-input, multiple-output (MIMO) transmitter employing N transmit antennas, where N is at least two. In one embodiment, the time-orthogonal preamble supplement generator includes an initial preamble supplement encoder configured to provide a preamble supplement to each of the N transmit antennas during an initial time interval. The time-orthogonal preamble supplement generator also includes a subsequent preamble supplement encoder coupled to the initial preamble supplement encoder and configured to provide the preamble supplement or a negation thereof to the N transmit antennas during (N−1) subsequent time intervals.

15 Claims, 8 Drawing Sheets

SCALABLE TIME-ORTHOGONAL PREAMBLE SUPPLEMENT GENERATOR, METHOD OF GENERATING AND MULTIPLE-INPUT, MULTIPLE-OUTPUT COMMUNICATION SYSTEM EMPLOYING THE GENERATOR AND METHOD

TECHNICAL FIELD OF THE INVENTION

The present invention is directed, in general, to communication systems and, more specifically, to a scalable time-orthogonal preamble supplement generator, a method of generating a time-orthogonal preamble supplement and a multiple-input, multiple-output (MIMO) communication system employing the generator or the method.

BACKGROUND OF THE INVENTION

Multiple-input, multiple-output (MIMO) communication systems have been shown to provide improvements in both capacity and reliability over single-input single-output (SISO) communication systems. Since increasing the capacity and reliability of communication systems is a focus driving much of systems technology, MIMO communication systems support this focus in the development of wireless networks. These MIMO communication systems commonly employ a block structure wherein a MIMO transmitter (which is a cooperating collection of N single-dimension transmitters) sends a vector of symbol information. This symbol vector may represent one or more coded or uncoded SISO data symbols. A MIMO receiver (which is a cooperating collection of M single-dimension receivers, where M is equal to or greater than N) receives one or more copies of this transmitted vector of symbol information. The performance of the entire communication system hinges on the ability of the receiver to find reliable estimates of the symbol vector that was transmitted by the transmitter. This necessitates that the MIMO receiver provide reliable channel estimates associated with transmissions from the MIMO transmitter.

For example, a 2×2 MIMO communication system may transmit two independent and concurrent signals, employing two single-dimension transmitters having separate transmit antennas and two single-dimension receivers having separate receive antennas. Alternatively, the antennas could be derived from a single physical antenna that appropriately employs polarization. Two receive signals $Y1(k)$, $Y2(k)$ on the $k^{th}$ sub-carrier/tone following a Fast Fourier Transformation and assuming negligible inter-symbol interference may be written as:

$$Y1(k)=H11(k)*X1(k)+H12(k)*X2(k)+n1(k)$$

$$Y2(k)=H21(k)*X1(k)+H22(k)*X2(k)+n2(k)$$

where $X1(k)$ and $X2(k)$ are two independent signals transmitted on the $k^{th}$ sub-carrier/tone from the first and second transmit antennas, respectively, and n1 and n2 are noises associated with the two receive signals. The term Hij(k), where i=1, 2 and j=1, 2, incorporates gain and phase distortion associated with symbols transmitted on the $k^{th}$ sub-carrier/tone from transmit antenna j to receive antenna i. The channel gain and phase terms Hij(k) may also include gain and phase distortions due to signal conditioning stages such as filters and other analog electronics. The receiver is required to provide estimates of the channel values Hij(k) to reliably decode the transmitted signals $X1(k)$ and $X2(k)$.

In order to estimate the channel coefficients Hij(k) at the receiver, the transmitter and the receiver employ training sequences. These training sequences are predetermined and known at both the transmitter and the receiver. In an IEEE 802.11(a) compliant system, a training sequence (called a long sequence) is employed as part of a preamble to the transmission of data. This long sequence involves the transmission of a known sequence of vector symbols, employing 52 excited tones (1 or −1), an unexcited tone (0) at DC and unexcited tones at each end of the spectrum, to provide a guard interval that is used to protect data tones from pass band filter effects. An appropriate calculation of individual channel coefficients H11(k), H12(k), H21(k), H22(k) may typically require a processor employing complex computations and correspondingly more computational power or time. Additionally, the level of computational complexity usually increases as the number of transmit antennas increases.

Accordingly, what is needed in the art is a way to provide enhanced channel estimates employing moderate calculations for a MIMO communication system having an expandable number of transmit antennas.

SUMMARY OF THE INVENTION

To address the above-discussed deficiencies of the prior art, the present invention provides a time-orthogonal preamble supplement generator for use with a multiple-input, multiple-output (MIMO) transmitter employing N transmit antennas, where N is at least two. In one embodiment, the time-orthogonal preamble supplement generator includes an initial preamble supplement encoder configured to provide a preamble supplement to each of the N transmit antennas during an initial time interval. The time-orthogonal preamble supplement generator also includes a subsequent preamble supplement encoder coupled to the initial preamble supplement encoder and configured to provide the preamble supplement or a negation thereof to the N transmit antennas during (N−1) subsequent time intervals.

In another aspect, the present invention provides a method of generating a time-orthogonal preamble supplement for use with a multiple-input, multiple-output (MIMO) transmitter employing N transmit antennas, where N is at least two. The method includes providing a preamble supplement to each of the N transmit antennas during an initial time interval. The method also includes further providing the preamble supplement or a negation thereof to the N transmit antennas during (N−1) subsequent time intervals.

The present invention also provides, in yet another aspect, a multiple-input, multiple-output (MIMO) communications system. The MIMO communications system includes a MIMO transmitter that has N transmit antennas, where N is at least two, and a time-orthogonal preamble supplement generator that is coupled to the MIMO transmitter. The time-orthogonal preamble supplement generator has an initial preamble supplement encoder that provides a preamble supplement to each of the N transmit antennas during an initial time interval, and a subsequent preamble supplement encoder, coupled to the initial preamble supplement encoder, that provides the preamble supplement or a negation thereof to the N transmit antennas during (N−1) subsequent time intervals. The MIMO communications system also includes a MIMO receiver that has M receive antennas and employs the preamble supplement and the negation to determine channel estimates.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
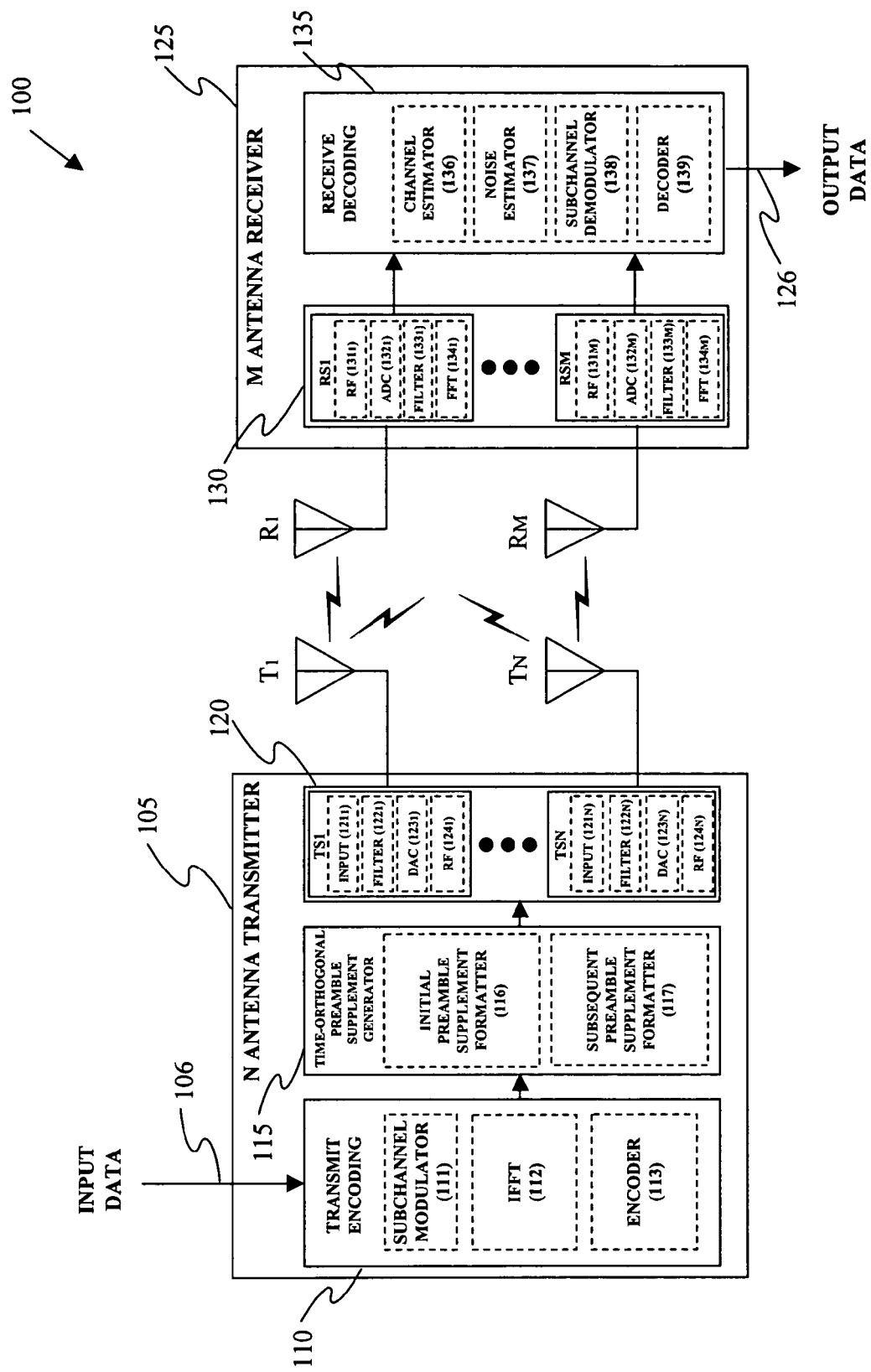
FIG. 1 illustrates a system diagram of an embodiment of an N×M MIMO communication system constructed in accordance with the principles of the present invention.

Referring initially to FIG. 1, illustrated is a system diagram of an embodiment of an N×M MIMO communication system, generally designated 100, constructed in accordance with the principles of the present invention. The MIMO communication system 100 includes a MIMO transmitter 105 and a MIMO receiver 125. The MIMO transmitter 105 includes input data 106, a transmit encoding system 110, a time-orthogonal preamble supplement generator 115 and a transmit system 120 having N transmit sections TS1-TSN coupled to N transmit antennas T1-TN, respectively. The receiver 125 includes a receive system 130 having M receive sections RS1-RSM respectively coupled to M receive antennas R1-RM, and a receive decoding system 135 providing output data 126. In the embodiment of FIG. 1, N and M are at least two.

The transmit encoding system 110 includes a subchannel modulator 111, an Inverse Fast Fourier Transform (IFFT) section 112 and an encoder 113. The subchannel modulator 111, IFFT section 112 and encoder 113 prepare the input data and support the arrangement of preamble information and signal information for transmission by the transmit system 120. The time-orthogonal preamble supplement generator 115 includes an initial preamble supplement encoder 116 and a subsequent preamble supplement encoder 117, which cooperate with the encoder 113, to generate a preamble so that the receiver 125 can estimate a communication channel needed to process the transmission. Additionally, the initial and subsequent preamble supplement encoders 116, 117 may be employed in either the frequency or time domain. For the time domain, an IFFT of the appropriate preamble information may be pre-computed and read from memory at the required transmission time.

The N transmit sections TS1-TSN include corresponding pluralities of N input sections $121_1$-$121_N$, N filters $122_1$-$122_N$, N digital-to-analog converters (DACs) N $123_1$-$123_N$ and N radio frequency (RF) sections $124_1$-$124_N$, respectively. The N transmit sections TS1-TSN provide a time domain signal proportional to preamble information, signal information and input data for transmission by the N transmit antennas T1-TN, respectively.

The M receive antennas R1-RM receive the transmission and provide it to the respective M receive sections RS1-RSM, which include corresponding M RF sections $131_1$-$131_M$, M analog-to-digital converters (ADCs) $132_1$-$132_M$, M filters $133_1$-$133_M$, and M Fast Fourier Transform (FFT) sections $134_1$-$134_M$, respectively. The M receive sections RS1-RSM provide a frequency domain digital signal, proportional to the preamble information, signal information and input data, to the receive decoding system 135. The receive decoding system 135 includes a channel estimator 136, a noise estimator 137, a subchannel demodulator 138 and a decoder 139 that employ the preamble information, signal information and input data to provide the output data 126. In the illustrated embodiment, the channel estimator 136 employs the preamble information for the purpose of estimating the communications channel. In the time-orthogonal preamble supplement generator 115, the initial preamble supplement encoder 116 provides a preamble supplement to each of the N transmit antennas during an initial time interval. The subsequent preamble supplement encoder 117 is coupled to the initial preamble supplement encoder 116 and provides the preamble supplement or a negation of the preamble supplement to the N transmit antennas during (N−1) subsequent time intervals.

In the illustrated embodiment, the preamble supplement is a known training sequence that is constantly provided to one of the N transmit antennas during the (N−1) subsequent time intervals. Alternatively, a negation of the training sequence (i.e., preamble supplement) is provided at least once to each of a subset of (N−1) transmit antennas during the (N−1) subsequent time intervals. The initial time interval and the (N−1) subsequent time intervals are contiguous and based on the number N. In the illustrated embodiment, the time-orthogonal preamble supplement generator 115 is configured to employ a formatting template to provide the preamble supplement and the negation of the preamble supplement to the N transmit antennas.

The preamble supplements and negations of the preamble supplement provided during the initial and (N−1) subsequent time intervals may be repeated during one or more additional periods of initial and (N−1) subsequent time intervals. Each of these additional periods of time is based on an integer multiple of the N transmit antennas, and they are also typically contiguous. The pattern of preamble supplements may temporally follow a standard preamble, such as one appropriate to IEEE 802.11(a).

The scalable property of the time-orthogonal preamble supplement generator 115 allows it to accommodate MIMO transmitters that employ an N of two or more transmit antennas. This property allows an associated MIMO receiver having M receive antennas to more effective calculate individual channel estimates. Providing time-orthogonal preamble supplements for additional periods of time accommodates scaling in the time dimension, as well. This allows the preamble supplements to be averaged, which may further provide additional enhancement for channel estimation.

Those skilled in the pertinent art will understand that the present invention can be applied to conventional or future-discovered MIMO communication systems. For example, these systems may form a part of a narrowband wireless communication system employing multiple antennas, a broadband communication system employing time division multiple access (TDMA) or a general multiuser communication system.

Figure 2:
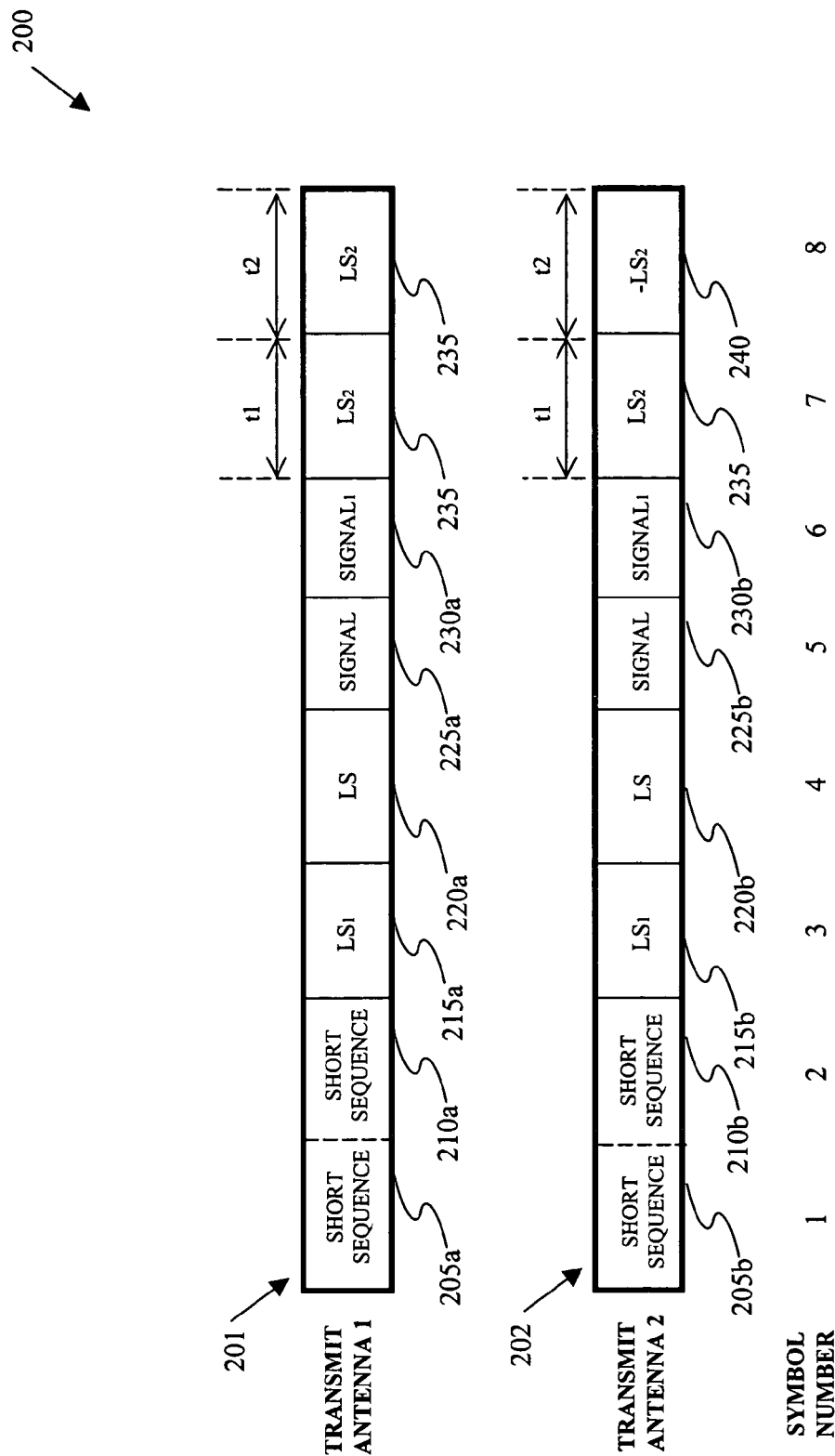
FIG. 2 illustrates a diagram of an embodiment of a transmission frame format employable with a time-orthogonal preamble supplement generator and constructed in accordance with the principles of the present invention.

Turning now to FIG. 2, illustrated is a diagram of an embodiment of a transmission frame format, generally designated 200, employable with a time-orthogonal preamble supplement generator and constructed in accordance with the principles of the present invention. The transmission frame format 200 may be employed with a MIMO transmitter having first and second transmit antennas, as was generally discussed with respect to FIG. 1, wherein N is equal to two. The transmission frame format 200 includes first and second transmission frames 201, 202 associated with the first and second transmit antennas, respectively.

The first and second transmission frames 201, 202 employ several standard fields that are common to both. These include standard short sequence fields 205a, 205b, 210a, 210b, standard long sequence fields 215a, 215b, 220a, 220b, standard signal fields 225a, 225b, and potential MIMO signal fields 230a, 230b during symbol bursts 1-6, respectively. During an initial time interval t1 corresponding to a symbol burst 7, a preamble supplement 235 is provided to each of the N transmit antennas. The first and second transmission frames 201, 202 include a training sequence $LS_2$ for the preamble supplement 235 that is provided to the first and second transmit antennas employing an initial preamble supplement encoder. During a subsequent time interval t2 corresponding to a symbol burst 8, the first transmission frame 201 includes the training sequence $LS_2$, and the second transmission frame 202 includes of a training sequence negation $-LS_2$ (i.e., a negation of the training sequence $LS_2$). These are respectively provided to the first and second transmit antennas employing a subsequent preamble supplement encoder.

During the initial time interval t1 corresponding to symbol burst 7 and the subsequent time interval t2 corresponding to symbol burst 8, first and second receive signals $Y_m[k,7]$, $Y_m[k,8]$ on first and second receive antennas may be written generally as:

$$Y_m[k,7]=(H_{m1}[k,7]+H_{m2}[k,7])LS_2+n_m[k,7] \tag{1a}$$

$$Y_m[k,8]=(H_{m1}[k,8]-H_{m2}[k,8])LS_2+n_m[k,8] \tag{1b}$$

where m denotes the receive path, k denotes the $k^{th}$ sub-carrier/tone index, and $n_m[k,7]$, $n_m[k,8]$ are associated noise terms. Assuming that the channels are constant over signal bursts 7 and 8, equations (1a) and (1b) may be combined to give:

$$Y_m[k,7]+Y_m[k,8]=2]\hat{H}_{m1}[k]LS_2+n_m[k,7]+n_m[k,8] \tag{1c}$$

$$Y_m[k,7]-Y_m[k,8]=2]\hat{H}_{m2}[k]LS_2+n_m[k,7]-n_m[k,8] \tag{1d}$$

Since the training sequence $LS_2$ is known, the channel estimates $\hat{H}_{m1}[k]$, $\hat{H}_{m2}[k]$ may be determined. A straightforward way is to neglect the effects of the noise terms $n_m[k,7]$, $n_m[k,8]$ and perform a simple least squares estimate.

As may be seen in FIG. 2, the preamble supplement is constantly provided to the first transmit antenna during the initial and subsequent time intervals t1, t2. The training sequence negation $-LS_2$ (i.e., negation of the preamble supplement) is provided at least once to the second transmit antenna during the subsequent time interval t2. As may also be seen in FIG. 2, the initial and subsequent time intervals t1, t2 are contiguous. However, alternative embodiments provide for separation of the initial time interval t1 and the subsequent time interval t2 as appropriate to a particular application. The employment of standard preamble fields allows the maintenance of backward compatibility with IEEE 802.11(a) compliant transmitters in embodiments of the present invention.

Figure 3A:
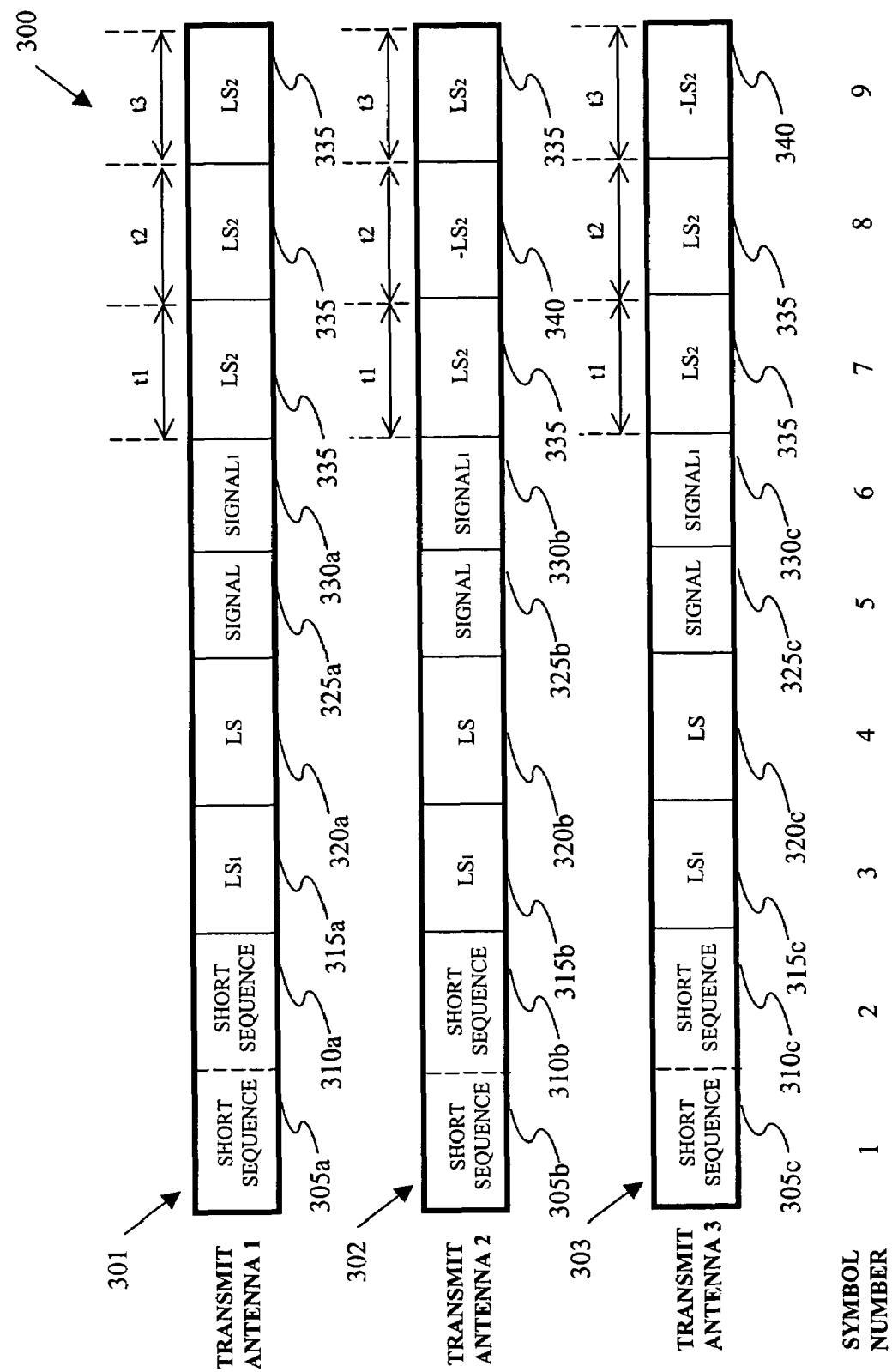
FIGS. 3A and 3B illustrate diagrams of alternative embodiments of transmission frame formats employable with a time-orthogonal preamble generator and constructed in accordance with the principles of the present invention.
Figure 3B:
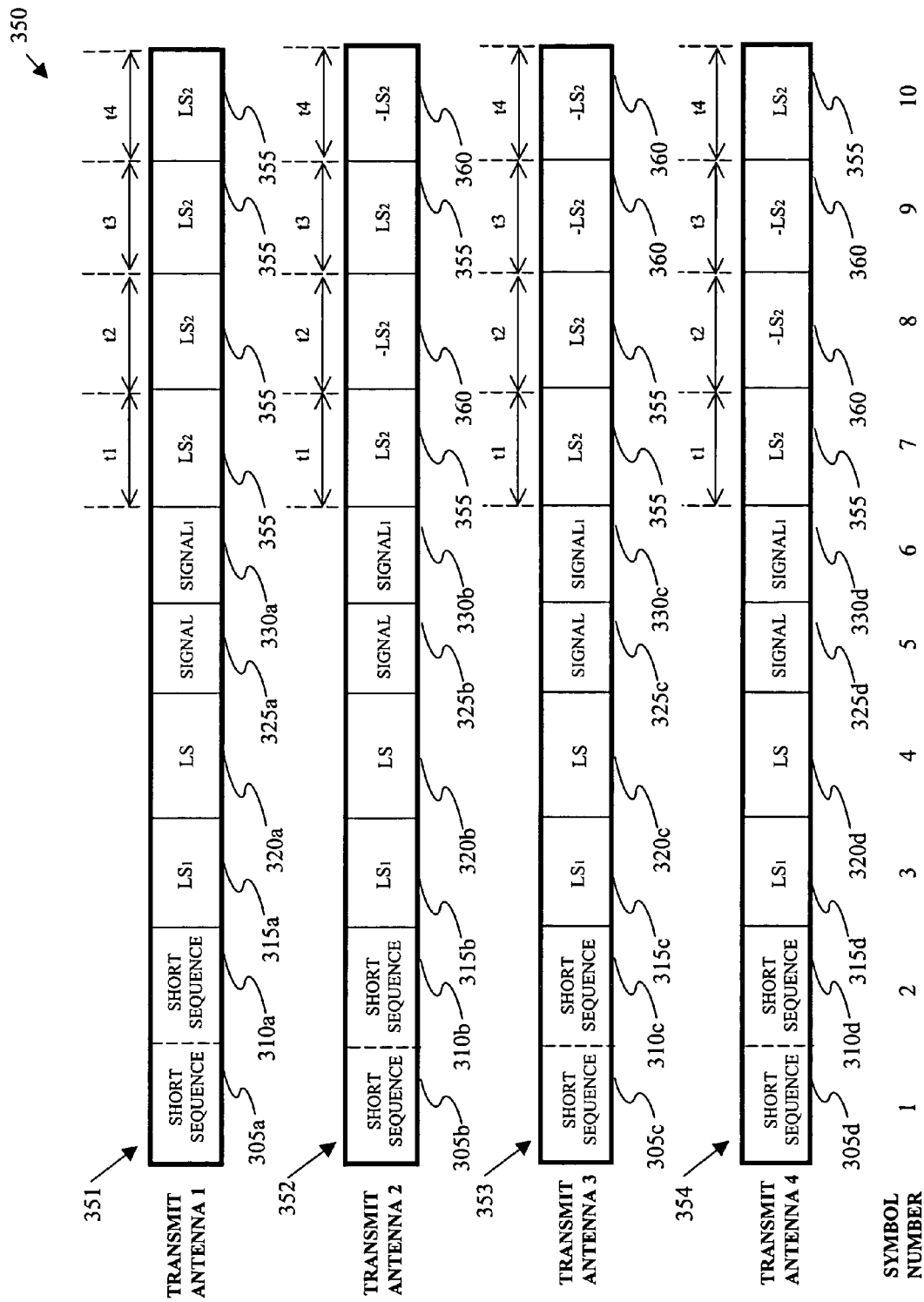

Turning now to FIGS. 3A and 3B, illustrated are diagrams of alternative embodiments of transmission frame formats, generally designated 300 and 350, employable with a time-orthogonal preamble generator and constructed in accordance with the principles of the present invention. In FIG. 3A, the transmission frame format 300 may be employed with a MIMO transmitter having first, second and third transmit antennas, as was generally discussed with respect to FIG. 1, wherein N is equal to three. The transmission frame format 300 includes first, second and third transmission frames 301, 302, 303 associated with the first, second and third transmit antennas, respectively.

Parallel to the previous discussion with respect to FIG. 2, the first, second and third transmission frames 301, 302 303 employ several standard fields that are common to all three. These include standard short sequence fields 305a, 305b, 305c, 310a, 310b, 310c standard long sequence fields 315a, 315b, 315c 320a, 320b, 320c, standard signal fields 325a, 325b, 325c, and potential MIMO signal fields 330a, 330b, 330c during symbol bursts 1-6, respectively.

During an initial time interval t1, the first, second and third transmission frames 301, 302, 303 include a preamble supplement 335 that is a training sequence $LS_2$. During a first subsequent time interval t2, the first and third transmission frames 301, 303 include the training sequence $LS_2$ and the second transmission frame 302 includes a negation of the preamble supplement 340, which is a training sequence negation $-LS_2$ Similarly, during a second subsequent time interval t3, the first and third transmission frames 301, 302 include the training sequence $LS_2$, and the third transmission frame 303 includes the training sequence negation $-LS_2$. It may be observed that the preamble supplement 335 is constantly provided to the first transmission frame 301 during all three time intervals t1, t2, t3. Additionally, the negation of the preamble supplement 340 is included once in each of the transmission frames 302, 303 during the first and second subsequent time intervals t2, t3.

With reference to FIG. 1 for the illustrated embodiment of FIG. 3A, the initial time interval t1 corresponds to symbol burst 7, the first subsequent time interval t2 corresponds to symbol burst 8 and the second subsequent time interval t3 corresponds to symbol burst 9. Then, first, second and third receive signals $Y_m[k,7]$, $Y_m[k,8]$, $Y_m[k,9]$ on first, second and third receive antennas may be written generally as:

$$Y_m[k,7]=(H_{m1}[k,7]+H_{m2}[k,7]+H_{m3}[k,7])LS_2+n_m[k,7] \tag{2a}$$

$$Y_m[k,8]=(H_{m1}[k,8]+H_{m2}[k,8]+H_{m3}[k,8])LS_2+n_m[k,8] \tag{2b}$$

$$Y_m[k,9]=(H_{m1}[k,9]-H_{m2}[k,9]-H_{m3}[k,9])LS_2+n_m[k,9] \tag{2c}$$

where again, m denotes the receive path, k denotes the $k^{th}$ sub-carrier/tone index, and $n_m[k,7]$, $n_m[k,8]$, $n_m[k,9]$ are associated noise terms. Assuming that the channels are constant over the signal bursts 7, 8, and 9, equations (2a), (2b) and (2c) may be manipulated to give:

$$Y_m[k,8]+Y_m[k,9]=2\hat{H}_{m1}[k]LS_2+n_m[k,8]+n_m[k,9] \quad (2d)$$

$$Y_m[k,7]-Y_m[k,8]=2\hat{H}_{m2}[k]LS_2+n_m[k,7]+n_m[k,8] \quad (2e)$$

$$Y_m[k,7]-Y_m[k,9]=2\hat{H}_{m3}[k]LS_2+n_m[k,7]+n_m[k,9] \quad (2f)$$

With the training sequence $LS_2$ known, the channel estimates $\hat{H}_{m1}[k]$, $\hat{H}_{m2}[k]$, $\hat{H}_{m3}[k]$ may be determined by neglecting the associated noise terms $n_m[k,7]$, $n_m[k,8]$, $n_m[k,9]$ and performing a least squares estimate.

In FIG. 3B, the transmission frame format 350 may be employed with a MIMO transmitter having first, second, third and fourth transmit antennas, as was generally discussed with respect to FIG. 1, wherein N is equal to four. The transmission frame format 350 includes first, second, third and fourth transmission frames 351, 352, 353, 354 associated with the first, second, third and fourth transmit antennas, respectively.

Again, parallel to the previous discussion with respect to FIG. 3A, the first, second and third transmission frames 351, 352, 353 include several standard fields. The fourth transmission frame 354 may include additional standard short sequence fields 305d, 310d, standard long sequence fields 315d, 320d, standard signal field 325d and a potential MIMO signal field 330d, during symbol bursts 1-6, respectively.

During an initial time interval t1, the first, second, third and fourth transmission frames 351, 352, 353, 354 include a preamble supplement 355 that is a training sequence $LS_2$. During a first subsequent time interval t2, the first and third transmission frames 351, 353 include the training sequence $LS_2$ and the second and fourth transmission frames 352, 354 include a negation of the preamble supplement 360, which is a training sequence negation $-LS_2$. Similarly, during a second subsequent time interval t3, the first and second transmission frames 351, 352 include the training sequence $LS_2$, and the third and fourth transmission frames 353, 354 include the training sequence negation $-LS_2$. Additionally, during a third subsequent time interval t4, the first and fourth transmission frames 351, 354 include the training sequence $LS_2$, and the second and third transmission frames 352, 354 include the training sequence negation $-LS_2$.

It may again be observed that the preamble supplement 355 is constantly provided to the first transmission frame 351 during all four time intervals t1, t2, t3, t4. Additionally, the negation of the preamble supplement 360 is included twice in each of the second, third and fourth transmission frames 352, 353, 354 during the subsequent time intervals t2, t3, t4. It should be understood that the combinations of the training sequence $LS_2$ and the training sequence negation $-LS_2$ presented during each of the initial and subsequent time intervals discussed with respect to the FIGS. 2, 3A and 3B are exemplary and could be appropriately rearranged between time intervals or transmission frames.

Again with reference to FIG. 1 for the illustrated embodiment of FIG. 3B, the initial time interval t1 corresponds to symbol burst 7, the first subsequent time interval t2 corresponds to symbol burst 8, the second subsequent time interval t3 corresponds to symbol burst 9 and the third subsequent time interval t4 corresponds to symbol burst 10. Then, first, second, third and fourth receive signals $Y_m[k,7]$, $Y_m[k,8]$, $Y_m[k,9]$, $Y_m[k,10]$ on first, second, third and fourth receive antennas may be written generally as:

$$Y_m[k,7]=(H_{m1}[k,7]+H_{m2}[k,7]+H_{m3}[k,7]+H_{m4}[k,7])LS_2+n_m[k,7] \quad (3a)$$

$$Y_m[k,8]=(H_{m1}[k,8]-H_{m2}[k,8]+H_{m3}[k,8]-H_{m4}[k,8])LS_2+n_m[k,8] \quad (3b)$$

$$Y_m[k,9]=(H_{m1}[k,9]+H_{m2}[k,9]-H_{m3}[k,9]-H_{m4}[k,9])LS_2+n_m[k,9] \quad (3c)$$

$$Y_m[k,10]=(H_{m1}[k,10]-H_{m2}[k,10]-H_{m3}[k,10]+H_{m4}[k,10])LS_2+n_m[k,10] \quad (3c)$$

where again, m denotes the receive path, k denotes the $k^{th}$ sub-carrier/tone index, and $n_m[k,7]$, $n_m[k,8]$, $n_m[k,9]$, $n_m[k,10]$ are associated noise terms. Assuming that the channels are constant over the signal bursts 7, 8, 9 and 10, equations (2a), (2b) (2c) and (2d) may be used to give:

$$Y_m[k,7]+Y_m[k,8]+Y_m[k,9]+Y_m[k,10]=4\hat{H}_{m1}[k]LS_2+n_m[k,7]+n_m[k,8]+n_m[k,9]+n_m[k,10] \quad (3e)$$

$$Y_m[k,7]-Y_m[k,8]+Y_m[k,9]-Y_m[k,10]=4\hat{H}_{m2}[k]LS_2+n_m[k,7]-n_m[k,8]+n_m[k,9]-n_m[k,10] \quad (3f)$$

$$Y_m[k,7]+Y_m[k,8]-Y_m[k,9]-Y_m[k,10]=4\hat{H}_{m3}[k]LS_2+n_m[k,7]+n_m[k,8]-n_m[k,9]-n_m[k,10] \quad (3g)$$

$$Y_m[k,7]-Y_m[k,8]-Y_m[k,9]+Y_m[k,10]=4\hat{H}_{m4}[k]LS_2+n_m[k,7]-n_m[k,8]-n_m[k,9]+n_m[k,10] \quad (3h)$$

Then, with the training sequence $IS_2$ known, the channel estimates $\hat{H}_{m1}[k]$, $\hat{H}_{m2}[k]$, $\hat{H}_{m3}[k]$, $\hat{H}_{m4}[k]$ may be determined by neglecting the associated noise terms $n_m[k,7]$, $n_m[k,8]$, $n_m[k,9]$ and performing a least squares estimate.

Figure 4:
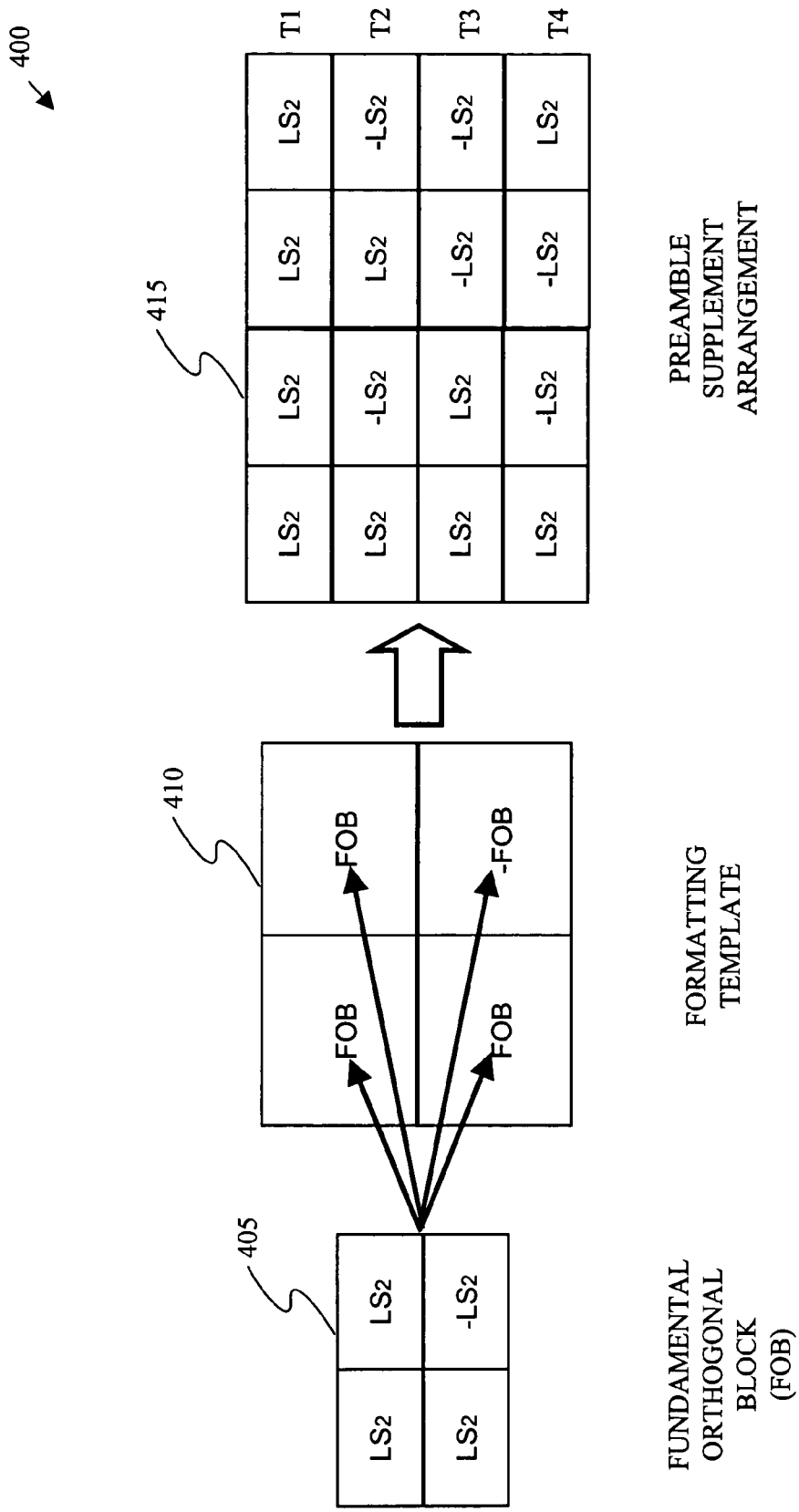
FIG. 4 illustrates a generation diagram showing an embodiment of a formatting template employable to provide a transmission frame format constructed in accordance with the principles of the present invention.

Turning now to FIG. 4, illustrated is a generation diagram showing an embodiment of a formatting template, generally designated 400, employable to provide a transmission frame format constructed in accordance with the principles of the present invention. For example, the generation diagram 400 may be employed to generate the arrangement of preamble supplements and negations of the preamble supplement for the transmission frame format 350 of FIG. 3B. The generation diagram 400 includes a fundamental orthogonal block 405, a formatting template 410 and a preamble supplement arrangement 415.

The fundamental orthogonal block 405 includes a fundamental set of preamble supplements and negations of the preamble supplement that are to be employed in the formatting template 410. For example, the fundamental orthogonal block 405 includes four fundamental cells contains three training sequences $LS_2$ and one training sequence negation $-LS_2$, in the arrangement shown. The formatting template 410 includes four formatting cells, which direct the application of four of the fundamental orthogonal blocks 405. It may be seen that three of the fundamental orthogonal blocks 405 are applied directly along with a negation of the fundamental orthogonal block 405 to the four formatting cells. This application provides the preamble supplement arrangement 415 shown in FIG. 4, which is the same arrangement shown in FIG. 3A. Of course, other embodiments or arrangements of the fundamental orthogonal block 405 or the formatting template 410 may be employed and are well within the broad scope of the present invention.

Figure 5A:
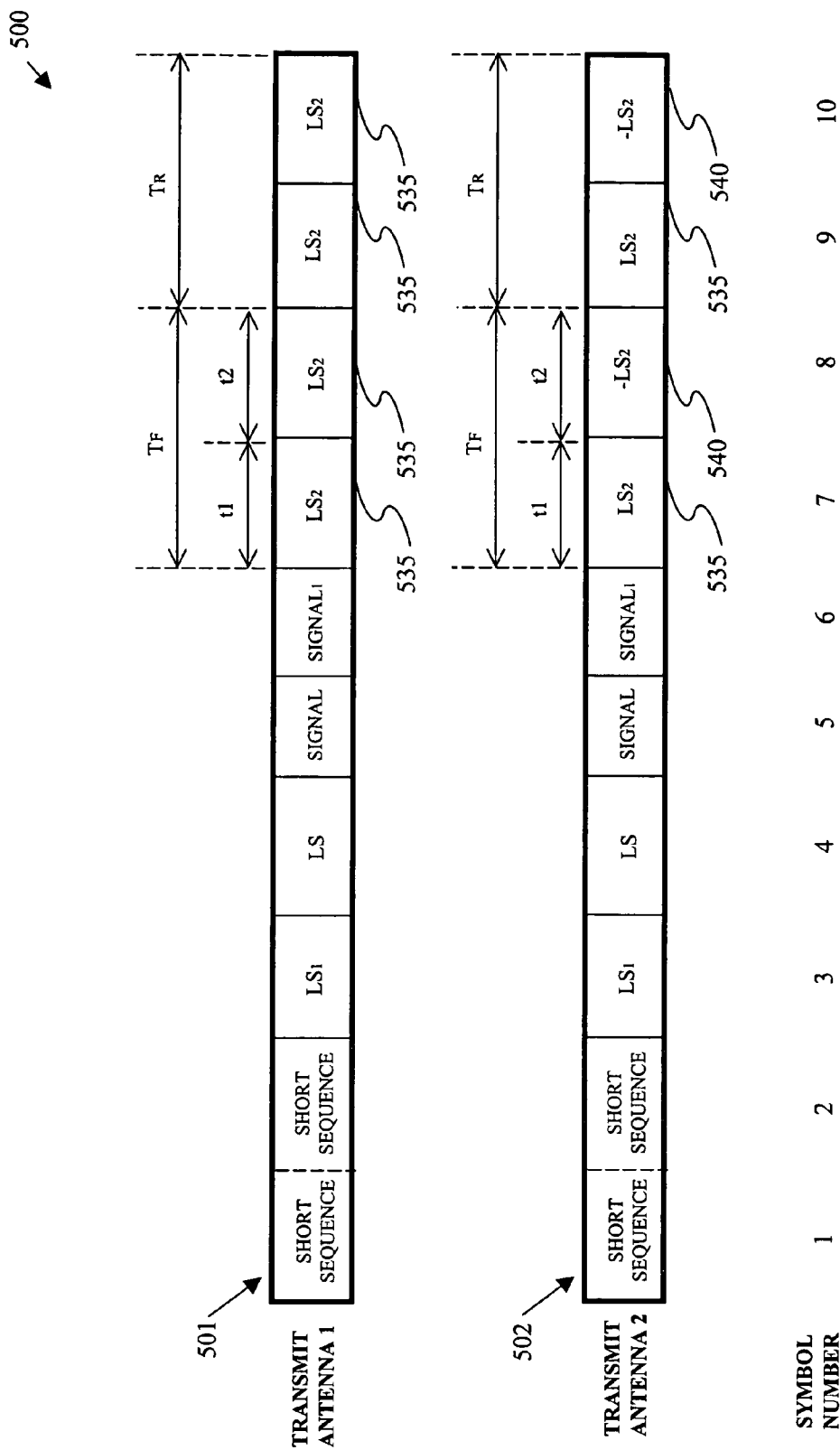
FIGS. 5A and 5B illustrate diagrams of additional alternative embodiments of transmission frame formats employable with a time-orthogonal preamble generator and constructed in accordance with the principles of the present invention.
Figure 5B:
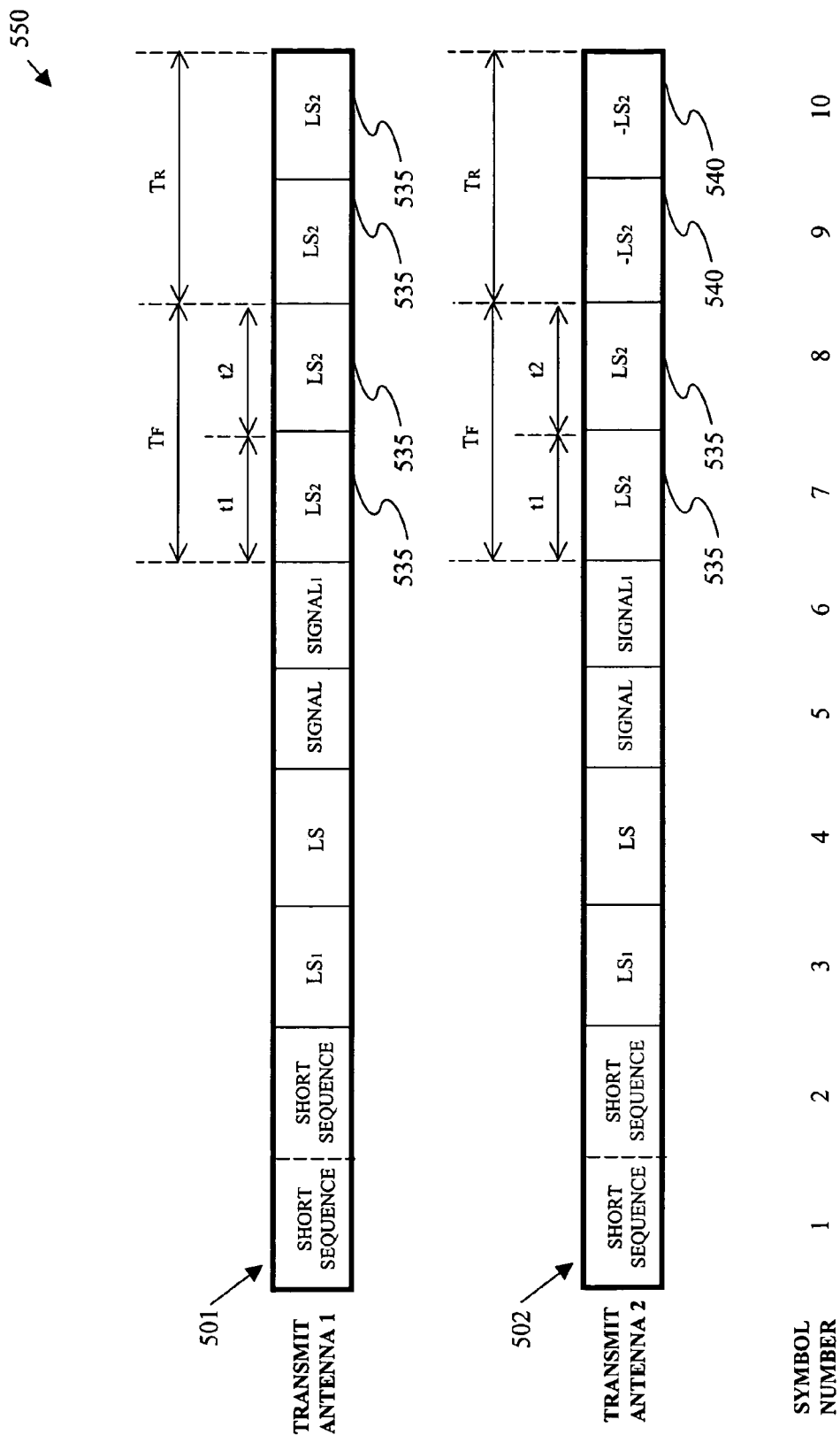

Turning now to FIGS. 5A and 5B, illustrated are diagrams of additional alternative embodiments of transmission frame formats, generally designated 500 and 550, employable with a time-orthogonal preamble generator and constructed in accordance with the principles of the present invention. In FIGS. 5A and 5B, the transmission frame formats 500 and 550 may be employed with a MIMO transmitter having first and second transmit antennas, as was generally discussed with respect to FIG. 1 for N equal to two and specifically discussed with respect to FIG. 2. The transmission frame formats 500, 550 include first and second transmission frames 501, 502 associated with the first and second transmit antennas, respectively.

In FIG. 5A, a first combination of a preamble supplement 535 employing a training sequence $LS_2$, and a negation of the preamble supplement 540 employing a training sequence negation $-LS_2$ is employed during a first time period $T_F$. This first combination is then repeated during an additional time period $T_R$. In FIG. 5B, a second combination employs the preamble supplement 535 during the first time period $T_F$ and the preamble supplement 535 and its negation 540 during the additional time period $T_R$.

These first and second combinations allow the preamble supplements to be averaged over time, thereby providing the opportunity for more effective channel estimates. It should be understood that the additional time period $T_R$ is an integer multiple of the N transmit antennas employed. Although only one additional period of time is employed in the illustrated embodiments, as many of the combinations appropriate to a particular application may be used.

Figure 6:
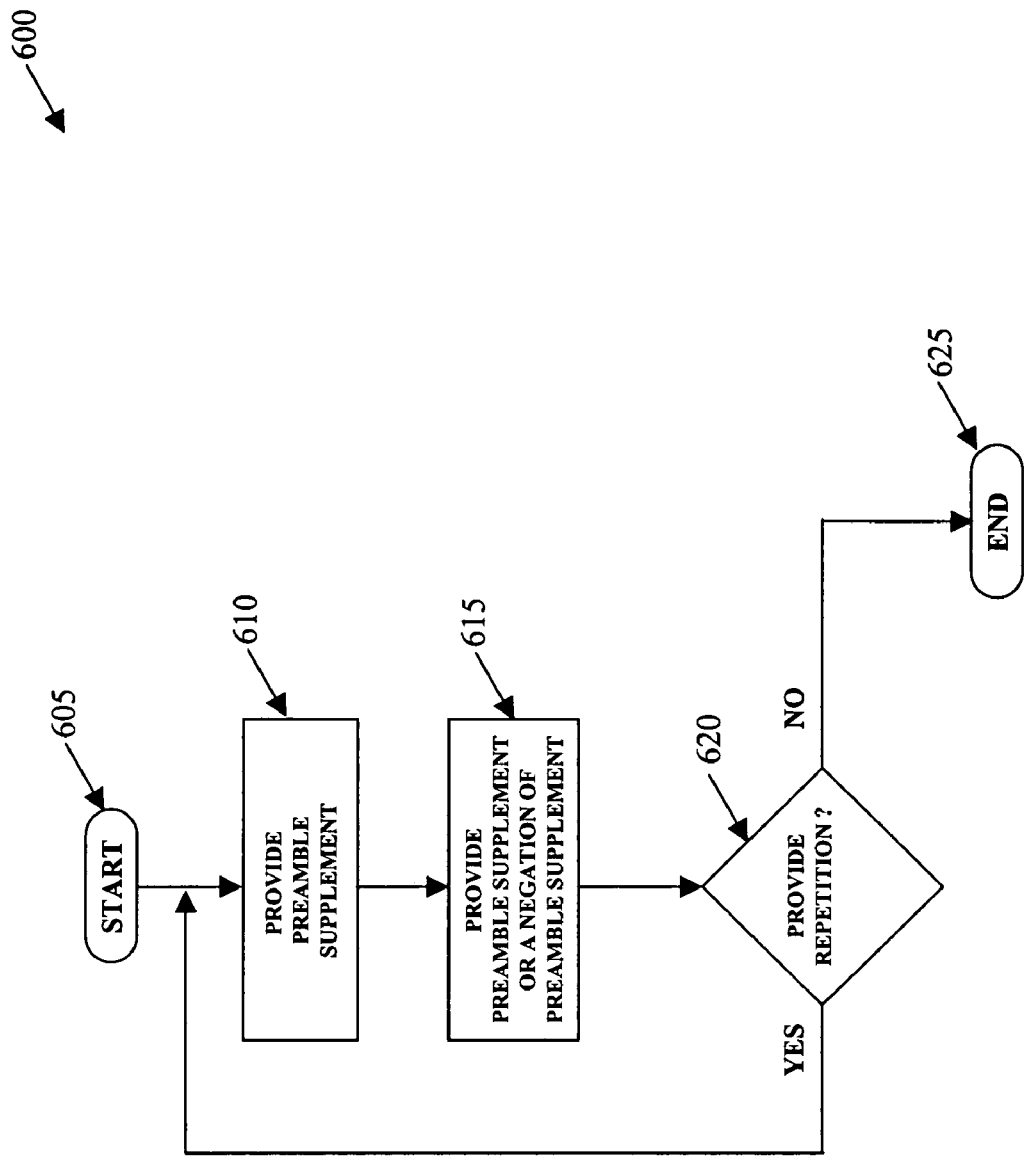
FIG. 6 illustrates a flow diagram of a method of generating a time-orthogonal preamble supplement carried out in accordance with the principles of the present invention.

Turning now to FIG. 6, illustrated is a flow diagram of a method of generating a time-orthogonal preamble supplement, generally designated 600, carried out in accordance with the principles of the present invention. The method 600 may be employed with a MIMO transmitter having N transmit antennas, where N is two or greater, and starts in a step 605. In a step 610, a preamble supplement is provided to the N transmit antennas during an initial time interval. Then during (N−1) subsequent time intervals, the preamble supplement or a negation of the preamble supplement is provided to the N transmit antennas in a step 615.

A decisional step 620 determines if the initial and (N−1) subsequent time intervals are to be repeated in one or more additional time periods. The length of each additional time period is an integer multiple of the N transmit antennas employed. If an additional time period is employed, the method 600 returns to the step 610 and steps 610 and 615 are repeated for the required number of additional time periods. When this requirement is met or if an additional time period is not required in the decisional step 620, the method 600 ends in a step 625.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps are not limitations of the present invention.

In summary, embodiments of the present invention employing a time-orthogonal preamble supplement generator, a method of generating a time-orthogonal preamble supplement and a MIMO communication system employing the generator or the method have been presented. Advantages include the important property that the generator and method are readily scalable to accommodate MIMO transmitters having N transmit antennas, where N may be two or greater. This property allows an associated MIMO receiver, having M receive antennas, to more effectively calculate individual channel estimates. A formatting template may be employed by the generator or the method to facilitate the appropriate arrangement of preamble supplements and negations of the preamble supplement. The channel estimates may be further enhanced by employing additional time periods that allow scaling in the time dimension, as well. Supplying time-orthogonal preamble supplements for additional time periods allows the preamble supplements to be averaged, thereby providing for additional channel estimation enhancement.

Although the present invention has been described in detail, those skilled in the art should understand that they can make various changes, substitutions and alterations herein without departing from the spirit and scope of the invention in its broadest form.

What is claimed is:

1. A time-orthogonal preamble supplement generator for use with a multiple-input, multiple-output (MIMO) transmitter employing N transmit antennas, N being at least two, comprising:
   an initial preamble supplement encoder configured to provide a preamble supplement to each of said N transmit antennas during an initial time interval; and
   a subsequent preamble supplement encoder coupled to said initial preamble supplement encoder and configured to provide said preamble supplement or a negation thereof to said N transmit antennas during (N−1) subsequent time intervals, wherein said generator configured to provide a repetition of said initial and (N −1) subsequent time intervals said repetition based on an integer multiple of said N transmit antennas.

2. The generator as recited in claim 1 wherein said preamble supplement is constantly provided to one of said N transmit antennas during said initial and (N−1) subsequent time intervals.

3. The generator as recited in claim 1 wherein said negation is provided at least once to each of a subset of (N−1) transmit antennas during said (N−1) subsequent time intervals.

4. The generator as recited in claim 1 wherein said initial and (N−1) subsequent time intervals are contiguous.

5. The generator as recited in claim 1 further configured to employ a formatting template to provide said preamble supplement and said negation to said N transmit antennas.

6. A method of generating a time-orthogonal preamble supplement for use with a multiple-input, multiple-output (MIMO) transmitter employing N transmit antennas, N being at least two, comprising:
   providing a preamble supplement to each of said N transmit antennas during an initial time interval;
   further providing said preamble supplement or a negation thereof to said N transmit antennas during (N−1) subsequent time intervals; and
   additionally providing a repetition of said initial and (N−1) subsequent time intervals, said repetition is based on an integer multiple of said N transmit antennas.

7. The method as recited in claim 6 wherein said preamble supplement is constantly provided to one of said N transmit antennas during said initial and (N−1) subsequent time intervals.

8. The method as recited in claim 6 wherein said negation is provided at least once to each of a subset of (N−1) transmit antennas during said (N−1) subsequent time intervals.

9. The method as recited in claim 6 wherein said initial and(N−1) subsequent time intervals are contiguous.

10. The method as recited in claim 6 further employing a formatting template to provide said preamble supplement and said negation to said N transmit antennas.

11. A multiple-input, multiple-output (MIMO) communications system, comprising:
- a MIMO transmitter that has N transmit antennas, N being at least two;
- a time-orthogonal preamble supplement generator that is coupled to said MIMO transmitter, including:
  - an initial preamble supplement encoder that provides a preamble supplement to each of said N transmit antennas during an initial time interval, and
  - a subsequent preamble supplement encoder, coupled to said initial preamble supplement encoder, that provides said preamble supplement or a negation thereof to said N transmit antennas during (N−1) subsequent time intervals and further provides a repetition of said initial and (N−1) subsequent time intervals, said repetition is based on an integer multiple of said N transmit antennas; and
- a MIMO receiver that has M receive antennas and employs said preamble supplement and said negation to determine channel estimates, provides a repetition of said initial and (N−1) subsequent time intervals, said repetition is based on an integer multiple of said N transmit antennas.

12. The system as recited in claim 11 wherein said preamble supplement is constantly provided to one of said N transmit antennas during said initial and (N−1) subsequent time intervals.

13. The system as recited in claim 11 wherein said negation is provided at least once to each of a subset of (N−1) transmit antennas during said (N−1) subsequent time intervals.

14. The system as recited in claim 11 wherein said initial and (N−1) subsequent time intervals are contiguous.

15. The system as recited in claim 11 that further employs a formatting to provide said preamble supplement and said negation to said N transmit antennas.

* * * * *